United States Patent
Ema et al.

(10) Patent No.: US 12,517,498 B2
(45) Date of Patent: Jan. 6, 2026

(54) ANALYSIS APPARATUS, ANALYSIS METHOD AND COMPUTER READABLE MEDIUM

(71) Applicant: Yokogawa Electric Corporation, Tokyo (JP)

(72) Inventors: Nobuaki Ema, Tokyo (JP); Takahiro Kambe, Tokyo (JP); Tatenobu Seki, Tokyo (JP); Masato Annen, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 381 days.

(21) Appl. No.: 17/687,687

(22) Filed: Mar. 7, 2022

(65) Prior Publication Data

US 2022/0308561 A1 Sep. 29, 2022

(30) Foreign Application Priority Data

Mar. 26, 2021 (JP) ................. 2021-054397

(51) Int. Cl.
*G05B 19/418* (2006.01)

(52) U.S. Cl.
CPC . *G05B 19/41835* (2013.01); *G05B 19/41865* (2013.01); *G05B 2219/24015* (2013.01); *G05B 2219/25011* (2013.01); *G05B 2219/25419* (2013.01)

(58) Field of Classification Search
CPC ........ G05B 19/41835; G05B 19/41865; G05B 2219/24015; G05B 2219/25011; G05B 2219/25419; G06Q 10/063; G06Q 10/06393

See application file for complete search history.

(56) References Cited

U.S. PATENT DOCUMENTS

| | | | |
|---|---|---|---|
| 2002/0128810 A1 | 9/2002 | Craig | |
| 2007/0177509 A1* | 8/2007 | Croak | G06Q 10/04 370/238 |
| 2014/0337000 A1* | 11/2014 | Asenjo | G06Q 10/06 703/13 |
| 2018/0113781 A1* | 4/2018 | Kim | G06F 11/3414 |

(Continued)

FOREIGN PATENT DOCUMENTS

| | | | |
|---|---|---|---|
| JP | 2003203151 A | | 7/2003 |
| JP | 2013029881 A | | 2/2013 |

(Continued)

OTHER PUBLICATIONS

Office Action issued for counterpart Japanese Application No. 2021-054397, issued by the Japanese Patent Office on May 9, 2023 (drafted on Apr. 26, 2023).

(Continued)

*Primary Examiner* — Thomas C Lee
*Assistant Examiner* — Tyler Dean Hedrick

(57) ABSTRACT

Provided is an analysis apparatus, including a work cost calculation unit configured to calculate a change in a work cost of a target plant when at least some target work, among work of an operator required to operate the target plant, is automatized. The analysis apparatus may include an automation cost calculation unit configured to calculate an automation cost for automatizing the target work; and a cost comparison unit configured to compare the work cost to the automation cost.

13 Claims, 18 Drawing Sheets

(56) References Cited

U.S. PATENT DOCUMENTS

| | | |
|---|---|---|
| 2018/0174084 A1 | 6/2018 | Murakami |
| 2020/0162312 A1* | 5/2020 | Balasubramanian .. G06N 5/022 |
| 2021/0149719 A1* | 5/2021 | Jones ...................... G06F 9/541 |
| 2021/0158268 A1* | 5/2021 | Berg ....................... G06F 9/451 |
| 2022/0092667 A1 | 3/2022 | Ishiguro |

FOREIGN PATENT DOCUMENTS

| | | |
|---|---|---|
| JP | 2018097801 A | 6/2018 |
| JP | 2019003545 A | 1/2019 |
| JP | 2019096268 A | 6/2019 |
| JP | 2021168027 A | 10/2021 |
| WO | 2020183667 A1 | 9/2020 |

OTHER PUBLICATIONS

Extended European Search Report for European Patent Application No. 22160475.4, issued by the European Patent Office on Apr. 11, 2022.

\* cited by examiner

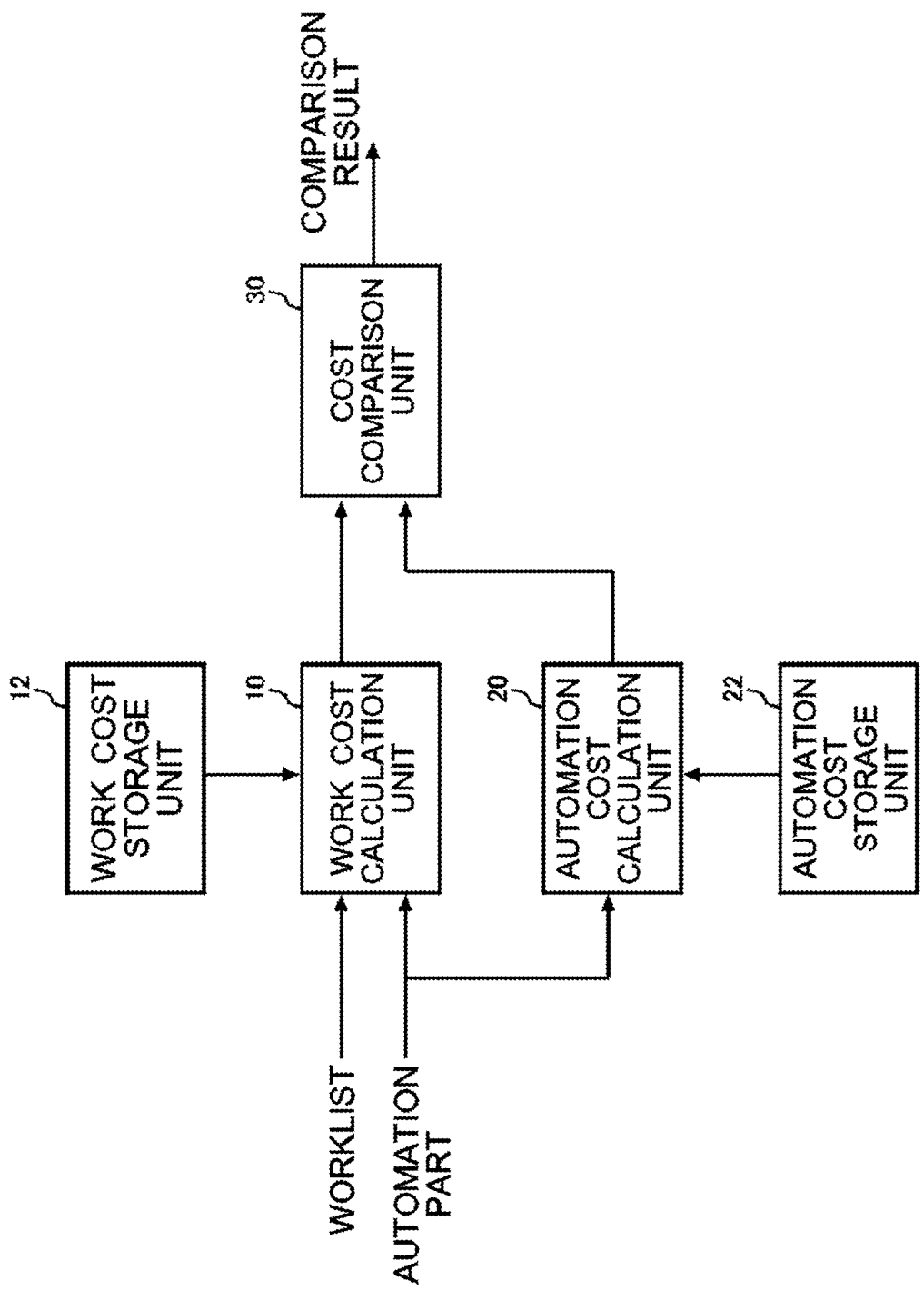

| TARGET WORK | FIRST WORKLOAD (BEFORE AUTOMATION) | SECOND WORKLOAD (AFTER AUTOMATION) | AUTOMATION TYPE |
|---|---|---|---|
| WORK A | WORKLOAD a | WORKLOAD a1 | AUTOMATION a1 |
| WORK A | WORKLOAD a | WORKLOAD a2 | AUTOMATION a2 |
| WORK A | WORKLOAD a | WORKLOAD a3 | AUTOMATION a3 |
| WORK B | WORKLOAD b | WORKLOAD b1 | AUTOMATION b1 |
| WORK B | WORKLOAD b | WORKLOAD b2 | AUTOMATION b2 |
| WORK B | WORKLOAD b | WORKLOAD b3 | AUTOMATION b3 |
| WORK C | WORKLOAD c | WORKLOAD c1 | AUTOMATION c1 |
| WORK C | WORKLOAD c | WORKLOAD c2 | AUTOMATION c2 |
| WORK C | WORKLOAD c | WORKLOAD c3 | AUTOMATION c3 |
| ⋮ | ⋮ | ⋮ | ⋮ |

| TARGET WORK | AUTOMATION TYPE | APPARATUS COST | WORK COST | OPERATION COST |
|---|---|---|---|---|
| WORK A | AUTOMATION a1 | APPARATUS COST a1 | WORK COST a1 | OPERATION COST a1 |
| WORK A | AUTOMATION a2 | APPARATUS COST a2 | WORK COST a2 | OPERATION COST a2 |
| WORK A | AUTOMATION a3 | APPARATUS COST a3 | WORK COST a3 | OPERATION COST a3 |
| WORK B | AUTOMATION b1 | APPARATUS COST b1 | WORK COST b1 | OPERATION COST b1 |
| WORK B | AUTOMATION b2 | APPARATUS COST b2 | WORK COST b2 | OPERATION COST b2 |
| WORK B | AUTOMATION b3 | APPARATUS COST b3 | WORK COST b3 | OPERATION COST b3 |
| WORK C | AUTOMATION c1 | APPARATUS COST c1 | WORK COST c1 | OPERATION COST c1 |
| WORK C | AUTOMATION c2 | APPARATUS COST c2 | WORK COST c2 | OPERATION COST c2 |
| WORK C | AUTOMATION c3 | APPARATUS COST c3 | WORK COST c3 | OPERATION COST c3 |
| ... | ... | ... | ... | ... |

22

WORK CONTENT: Y1→Y2a→Y3→Y4→Y5→Y6→Y7→...→Ym
            ↗Y2b↘

WORKLIST:    W1  →  W2  →  W3  →...→Wn

FIG.6

| TARGET WORK | OPERATOR | WORK TIME (BEFORE AUTOMATION) |
|---|---|---|
| WORK A | OPERATOR a1, a2 | TIME a1 |
| WORK A | OPERATOR a2 | TIME a2 |
| WORK A | OPERATOR a3 | TIME a3 |
| WORK B | OPERATOR b1 | TIME b1 |
| WORK B | OPERATOR b2, b3 | TIME b2 |
| WORK B | OPERATOR b3 | TIME b3 |
| WORK C | OPERATOR c1 | TIME c1 |
| WORK C | OPERATOR c2 | TIME c2 |
| WORK C | OPERATOR c3 | TIME c3 |
| ⋮ | ⋮ | ⋮ |

| TARGET WORK | OPERATOR | WORK TIME (BEFORE AUTOMATION) | WORK TIME (AFTER AUTOMATION) | AUTOMATION TYPE |
|---|---|---|---|---|
| WORK A | OPERATOR aa1 | TIME aa1 | TIME aa4 | AUTOMATION a1 |
| WORK A | OPERATOR aa2 | TIME aa2 | TIME aa5 | AUTOMATION a2 |
| WORK A | OPERATOR aa3 | TIME aa3 | TIME aa6 | AUTOMATION a3 |
| WORK B | OPERATOR bb1 | TIME bb1 | TIME bb4 | AUTOMATION b1 |
| WORK B | OPERATOR bb2 | TIME bb2 | TIME bb5 | AUTOMATION b2 |
| WORK B | OPERATOR bb3 | TIME bb3 | TIME bb6 | AUTOMATION b3 |
| WORK C | OPERATOR cc1 | TIME cc1 | TIME cc4 | AUTOMATION c1 |
| WORK C | OPERATOR cc2 | TIME cc2 | TIME cc5 | AUTOMATION c2 |
| WORK C | OPERATOR cc3 | TIME cc3 | TIME cc6 | AUTOMATION c3 |
| ... | ... | ... | ... | ... |

14  *FIG.11*

| TARGET WORK | OPERATOR | ACTUAL WORKING HOURS (BEFORE AUTOMATION) | ACTUAL WORKING HOURS (AFTER AUTOMATION) | AUTOMATION TYPE |
|---|---|---|---|---|
| WORK A | OPERATOR aa1 | TIME aa1 | TIME aa4 | AUTOMATION a1 |
| WORK A | OPERATOR aa2 | TIME aa2 | TIME aa5 | AUTOMATION a2 |
| WORK A | OPERATOR aa3 | TIME aa3 | TIME aa6 | AUTOMATION a3 |
| WORK B | OPERATOR bb1 | TIME bb1 | TIME bb4 | AUTOMATION b1 |
| WORK B | OPERATOR bb2 | TIME bb2 | TIME bb5 | AUTOMATION b2 |
| WORK B | OPERATOR bb3 | TIME bb3 | TIME bb6 | AUTOMATION b3 |
| WORK C | OPERATOR cc1 | TIME cc1 | TIME cc4 | AUTOMATION c1 |
| WORK C | OPERATOR cc2 | TIME cc2 | TIME cc5 | AUTOMATION c2 |
| WORK C | OPERATOR cc3 | TIME cc3 | TIME cc6 | AUTOMATION c3 |
| ... | ... | ... | ... | ... |

14  *FIG. 13*

| TARGET WORK | AUTOMATION TYPE | RISK CASE | COST | PERIOD | RANGE |
|---|---|---|---|---|---|
| WORK A | AUTOMATION a1 | COMPONENT FAILURE a1 | COST a1 | PERIOD a1 | RANGE a1 |
| WORK A | AUTOMATION a2 | QUALITY DETERIORATION a2 | COST a2 | PERIOD a2 | RANGE a2 |
| WORK A | AUTOMATION a3 | NO PROBLEM | | | |
| WORK B | AUTOMATION b1 | NO PROBLEM | | | |
| WORK B | AUTOMATION b2 | QUALITY DETERIORATION b2 | COST b2 | PERIOD b2 | RANGE b2 |
| WORK B | AUTOMATION b3 | COMPONENT DETERIORATION b3 | COST b3 | PERIOD b3 | RANGE b3 |
| WORK C | AUTOMATION c1 | COMPONENT FAILURE c1 | COST c1 | PERIOD c1 | RANGE c1 |
| WORK C | AUTOMATION c2 | QUALITY DETERIORATION c2 | COST c2 | PERIOD c2 | RANGE c2 |
| WORK C | AUTOMATION c3 | COMPONENT DETERIORATION c3 | COST c3 | PERIOD c3 | RANGE c3 |
| ... | ... | ... | ... | ... | ... |

*FIG.16*  52

ANALYSIS APPARATUS, ANALYSIS METHOD AND COMPUTER READABLE MEDIUM

The contents of the following Japanese patent application(s) are incorporated herein by reference:

No. 2021-054397 filed in JP on Mar. 26, 2021.

BACKGROUND

1. Technical Field

The present invention relates to an analysis apparatus, an analysis method and a computer readable medium having a program recorded thereon.

2. Related Art

Conventionally, an apparatus capable of selecting a process in a plant or the like from a manual mode and an automatic mode is known (for example, refer to Patent Document 1).

Patent Document 1: Japanese Patent Application Publication No. 2019-96268

SUMMARY

In a first aspect of the present invention, provided is an analysis apparatus, including a work cost calculation unit configured to calculate a change in a work cost of a target plant when at least some target work, among work of an operator required to operate the target plant, is automatized.

The analysis apparatus may include an automation cost calculation unit configured to calculate an automation cost to automatize target work. The analysis apparatus may include a cost comparison unit configured to compare a work cost to an automation cost.

The work cost calculation unit may calculate a change in the work cost, based on a first workload of the operator when the target work is note automatized and a second workload of the operator when the target work is not automatized.

The analysis apparatus may include a monitoring load calculation unit configured to calculate, when the target work is automatized, a change in a monitoring load on the operator for the target work performed automatically.

The work cost calculation unit may calculate a change in the work cost when the operator is allowed to perform another piece of work, provided that the monitoring load on the operator is reduced by automatizing the target work.

The analysis apparatus may include a work history storage unit configured to store a history of work performed by the operator in the target plant under operation. The work cost calculation unit may calculate the first workload based on the history of the work stored in the work history storage unit.

The analysis apparatus may include a work history storage unit configured to store a history of work performed by the operator in an existing plant under operation. The work cost calculation unit may calculate the first workload based on the history of the work stored in the work history storage unit.

The work history storage unit may store a history of work before automation and a history of work after automation when work is automatized in the existing plant. The work cost calculation unit may calculate the first workload and the second workload based on a history of the work stored in the work history storage unit.

The work cost calculation unit may calculate a change in the work cost when automatized for a plurality of pieces of the target work. The analysis apparatus may include a work extraction unit, which is configured to extract work that should be automatize, based on a change in a plurality of the work costs that are calculated by the work cost calculation unit.

The analysis apparatus may include a risk storage unit configured to store risk assessment information for evaluating a risk occurred when automatized for the plurality of pieces of the target work of the target plant. The work extraction unit may extract work that should be automatized further based on the risk assessment information.

The risk storage unit may store, as the risk assessment information, information related to a case where work in an existing plant is automatized.

The analysis apparatus may include a risk assessment generation unit configured to simulate a behavior of a target apparatus to be a target of work, and produce the risk assessment information of the work, based on an actual behavior result of the target apparatus when the work is performed and a behavior result according to the simulation.

The analysis apparatus may include a risk assessment generation unit configured to produce, for a target apparatus to be a target of work, the risk assessment information of the work for the target apparatus, based on a difference between an intermediate manufactured product input into the target apparatus and a processed manufactured product output by the target apparatus.

In a second aspect of the present invention provides an analysis method for calculating a change in a work cost of a target plant when at least some target work is automatized among work of an operator required to operate the target plant.

A third aspect of the present invention provides a program for causing a computer to execute the analysis method according to the second aspect.

The summary clause does not necessarily describe all necessary features of the embodiments of the present invention. The present invention may also be a sub-combination of the features described above.

BRIEF DESCRIPTION OF THE DRAWINGS

FIG. 1 illustrates a configuration example of an analysis apparatus 100 for analyzing behaviors of a plant.

FIG. 2 illustrates one example of information stored by a work cost storage unit 12.

FIG. 3 illustrates one example of information stored by an automation cost storage unit 22.

FIG. 6 illustrates an exemplary behavior of a worklist generation unit 40.

FIG. 10 illustrates one example of a work history stored in the work history storage unit 14.

FIG. 11 illustrates another example of the work history stored in the work history storage unit 14.

FIG. 13 illustrates another example of information stored in the work history storage unit 14.

FIG. 16 illustrates one example of a risk assessment information stored by the risk storage unit 52.

DESCRIPTION OF EXEMPLARY EMBODIMENTS

Figure 4:
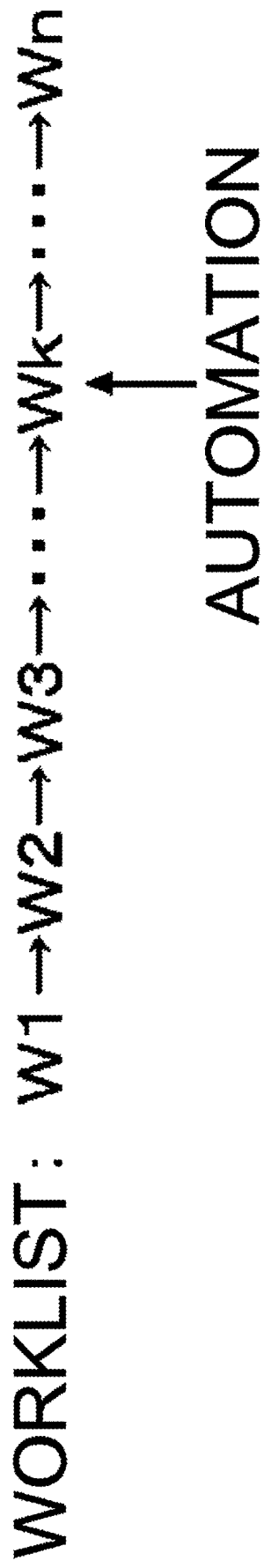
FIG. 4 illustrates one example of a worklist.

Hereinafter, the present invention will be described through embodiments of the invention, but the following embodiments do not limit the invention according to the claims. And all the combinations of the features described in the embodiment(s) are not necessarily essential to means provided by aspects of the invention.

FIG. 1 illustrates a configuration example of an analysis apparatus 100 configured to analyze a behavior of a plant. The analysis apparatus 100 may be configured to analyze a behavior of an existing plant, or may also be configured to analyze a behavior of a plant to be constructed in the future. The plant is, for example, at least a part of a facility such as a water treatment facility, a production facility, a power generation facility and a storage facility. The analysis target plant is referred to as a target plant. The target plant includes a facility such as a device and a pipeline. In the present specification, the facility such as a device and a piping is simply referred to as 'device' when they are not particularly explicitly distinguished from each other.

The analysis apparatus 100 of the present example is a computer configured to perform predetermined data processing. The computer may be configured to execute a program for causing the computer to function as each unit of the analysis apparatus 100.

The analysis apparatus 100 analyzes the change of a work cost of the target plant when the work of the operator that are required to operate the target plant is automatized. The work required to operate the target plant includes all work that affects the behavior or reliability of the target plant by performing such work. For example, such work includes work of direct operating valves or the like of the devices included in the target plant, work of indirect control of the target plant device by a computer for control provided in the target plant, and work of control of the target plant device from a remote location by computer or the like. Also, the work of the operator includes work for monitoring a state of the target plant device. Also, the operator's work also includes work that does not directly affect the behavior of the target plant, such as communication to other operators, but occurs incidentally to operating the target plant. The work required to operate the target plant does not include the work to construct the target plant.

The work cost is a cost required for performing the work. The work cost may be expressed in monetary terms or expressed in other units. For example, the work cost may be expressed as the product of the number of people required for the work and the work time (so-called man-hours). The work cost may include the amount of power and other resources required for the work. The work cost may be the sum of a plurality of types of costs, converted into monetary values. Work costs may include costs that are incurred continuously at each predetermined unit time, or at a predetermined timing such as at the beginning of the work.

Automation of work means that part or all of the work that used to be done by operators is now done automatically by machines, robots, or computers. The automated work may be done entirely by a machine or computer, or it may be done collaboratively by an operator and a machine or computer or the like. Each piece of work may be automatized so that the results produced by each piece of work are the same before and after the automation.

The analysis apparatus 100 includes a work cost calculation unit 10. The analysis apparatus 100 may include a work cost storage unit 12, an automation cost calculation unit 20, an automation cost storage unit 22 and a cost comparison unit 30.

The work cost calculation unit 10 calculates the change in the work cost of the target plant when at least some of the target work of the work of the operators required to operate the target plant is automatized. The work cost calculation unit 10 in this example may be input with a worklist indicating all or part of the operator's work required to operate the target plant and information on the automation parts indicating which work is to be automatized. The worklist and the automation parts may be specified by the user of the analysis apparatus 100.

The work cost calculation unit 10 may calculate the change in the work cost based on the first workload of the operator when the target work is not automatized and the second workload of the operator when the target work is automatized. The workload of an operator is, for example, the product (man-hours) of the number of people and time required for the relevant work.

The work cost storage unit 12 stores the information for calculating the above-mentioned work cost. For example, the work cost storage unit 12 may store the first workload without automation and the second workload with automation for a plurality of pieces of work. The work cost calculation unit 10 may calculate the change in the work cost when the target work is not automatized and when the target work is automatized, based on the information stored by the work cost storage unit 12. In this way, the degree of reduction in work cost when the target work is automatized can be analyzed.

The automation cost calculation unit 20 calculates the automation cost for automatizing the target work. The automation cost may include all costs for automatizing the target work. For example, the automation cost includes costs of the machine, computer and other apparatus used for the automation of the target work. The automation cost calculation unit 20 may search for the apparatus used for automation from the database that stores apparatus that can be diverted from other plants. The database may be provided in the analysis apparatus 100, or may be connectable to the analysis apparatus 100 via the network. The costs for automatizing each apparatus are stored in the database. The database may store surplus apparatus that is not being used in other plants. Also, the automation cost may include costs of the engineers and other work required for automatizing the process. Also, the automation cost may include a cost that is incurred continuously at each predetermined unit time or at a predetermined timing such as at the time of automation. The information indicating the automation part may be input into the automation cost calculation unit 20.

The automation cost storage unit 22 stores information for calculating the above-mentioned automation cost. For example, the automation cost storage unit 22 may store the apparatus required for automation, the cost of the apparatus, and the cost of the work for a plurality of pieces of work. The automation cost calculation unit 20 may calculate the automation cost of the target work based on the information stored by the automation cost storage unit 22.

The cost comparison unit 30 compares the work cost calculated by the work cost calculation unit 10 with the automation cost calculated by the automation cost calculation unit 20. The cost comparison unit 30 may compare the decrease of the work cost due to automation of the target work with the automation cost. The cost comparison unit 30 may compare the decrease in the work cost with the automation cost when the plant is operated for a predetermined period after automation. The period may be designated by the user of the analysis apparatus 100, or may use a preset period. The cost comparison unit 30 may calculate the transition of the comparison result between the decrease of the work cost and the automation cost when the period is varied. The cost comparison unit 30 may determine whether the decrease of the work cost is greater than the automation cost or not. The cost comparison unit 30 may calculate how much greater the decrease in the work cost is than the automation cost. In this way, the cost benefits of automation can be analyzed. The cost comparison unit 30 may output the comparison result to the user of the analysis apparatus 100. The cost comparison unit 30 may display the comparison results and may transmit them.

The analysis apparatus 100 may regard a plant under operation as the target plant. The analysis apparatus 100 may also regard a plant in the design stage as the target plant. The analysis apparatus 100 may determine whether each work should be automatized or not based on the comparison result of the cost comparison unit 30.

FIG. 2 illustrates one example of information stored in the work cost storage unit 12. The work cost storage unit 12 may store the first workload before automation, the type of automation, and the second workload after automation for each piece of work to operate the plant. The type of automation refers to an aspect of automation such as the apparatus used, the degree of automation or the like. For example, even if the same work is to be automatized, the reliability and other aspects of the automatized work change by using the apparatus with different performance. Also, even for the automation of the same work, the degree of automation varies depending on the workload that the operator must perform after automation. For example, in the work that includes a plurality of operations, the type of automation varies by changing the number of operations to be automatized.

The work cost storage unit 12 may store the plurality of automation types with respect to the identical work. The work cost storage unit 12 may store the second workload for each automation type. Since the first workload before automation is the same even if the automation method is different, the work cost storage unit 12 may store the same first workload for the same work even if the automation type is different. The work cost storage unit 12 may store the first workload, the second workload and the automation type for the respective pieces of work based on the performance of the automation performed on the existing plant. The work cost storage unit 12 may store the first workload and the second workload analyzed by simulation or other methods based on the automation type and the contents of the target work.

FIG. 3 illustrates one example of information stored in the automation cost storage unit 22. The automation cost storage unit 22 stores at least one of the apparatus cost for automation, the work cost for automation or the operating cost of the apparatus after automation for each automation type with respect to the respective pieces of work. The automation cost storage unit 22 may store the plurality of automation types with respect to identical work.

The analysis apparatus 100 may compare the change in the work cost to the automation cost for the plurality of automation types of the target work. The analysis apparatus 100 may extract the automation type with the greatest benefit of cost.

The automation cost storage unit 22 may store at least one of the apparatus cost, work cost or the operating cost based on the performance of the automation performed on the existing plant. The automation cost storage unit 22 may store each cost analyzed by simulation or other methods based on the automation type and the contents of the target work.

FIG. 4 illustrates one example of the worklist. The worklist includes a plurality of pieces of work W1 to Wn. Each piece of work may be arranged in chronological order according to the sequence of the work. Some of the work may be done in parallel with another piece of work. The analysis apparatus 100 analyzes the change in work cost or the like, when one or more pieces of target work Wk included in the worklist are automatized.

Each piece of work included in the worklist is organized to be independent so that changes added to each piece of work do not directly affect the other work. Each piece of work is configured so that the results of the previous or further previous work are input and the process is performed according to the input. The processing of each piece of work does not depend on the processing method in other work. In other words, regardless of processing method in other work (for example, whether manual or automatic, changes in parameters such as processing temperature, processing time and so on, or whether processing is done in parallel on a plurality of lines or sequentially on a single line), processing is dependent on the results that are input.

If, for example, the automation of work W1 affects the processing of other work W2 to Wn, not only the work cost of work W1 but also the work cost of other work W2 to Wn may vary. In this case, changes in the work cost cannot be analyzed accurately without analyzing changes in the work cost for the entire work. On the other hand, by structuring each piece of work so that each piece of work maintains its independence as in this example, changes in the work cost of the entire work can be analyzed with high accuracy if only the work cost of the work to be automatized is analyzed.

Figure 5:
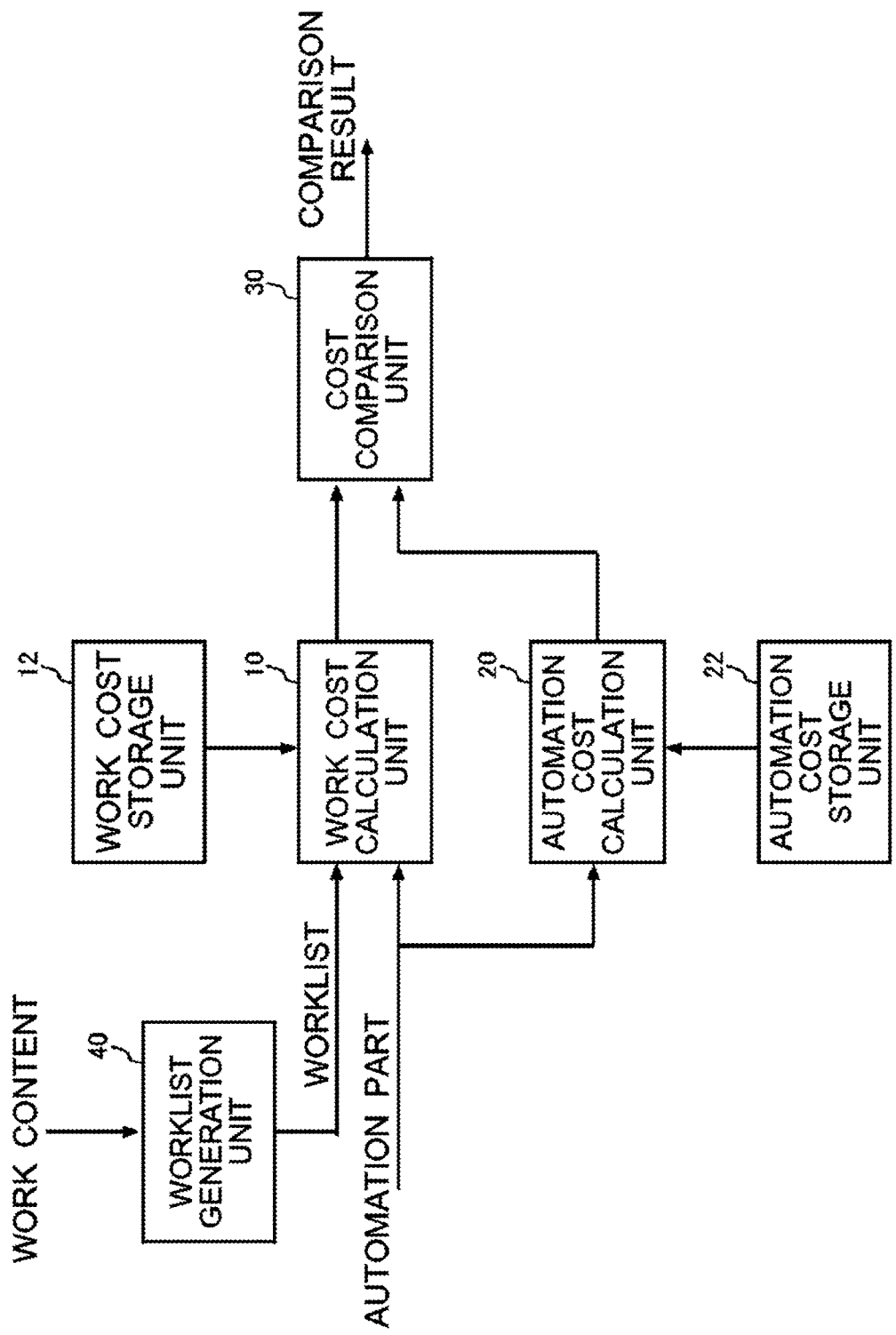
FIG. 5 illustrates another configuration example of the analysis apparatus 100.

FIG. 5 illustrates another configuration example of the analysis apparatus 100. The analysis apparatus 100 in this example further includes a worklist generation unit 40 with respect to the example shown in FIG. 1. The other configurations are similar to those of the analysis apparatus 100 described in FIG. 1 to FIG. 4.

The worklist generation unit 40 produces the worklist described in FIG. 4. The work contents of the operator to operate the target plant are input into the worklist generation unit 40. The work content may indicate the content of each operation required of the operator. The worklist generation unit 40 combines one or more operations based on the content of each operation as one piece of work.

FIG. 6 illustrates an exemplary behavior of the worklist generation unit 40. In the worklist, the work contents including a plurality of operations Y1 to Ym in chronological order are input. Each operation Y may be an operation on the plant's device, for example, adjusting the aperture of a valve, increasing the temperature of the apparatus and so on. The work content may be input by a user or the like of the analysis apparatus 100. The operation Y may include the screen display of the plant's control apparatus, or operations to confirm the state of the plant's device, such as confirming sensor values.

The worklist generation unit 40 combines one or more operations Y into one piece of work W. The worklist generation unit 40 detects other operations that are affected if an operation Y is automatized based on the respective operation contents. For example, for two operations that need to be performed in parallel, such as operations Y2a and Y2b in FIG. 6, a delay in one operation can delay the other operation. In such as case, the worklist generation unit 40 detects these operations as operations that affect each other. The worklist generation unit 40 converts the operation contents into a worklist so that operations that affect each other are included in a single piece of work.

With such a process, each operation Y can be combined into work W that retains its independence. This allows the cost of automatizing each piece of work to be analyzed with greater accuracy.

Figure 7:
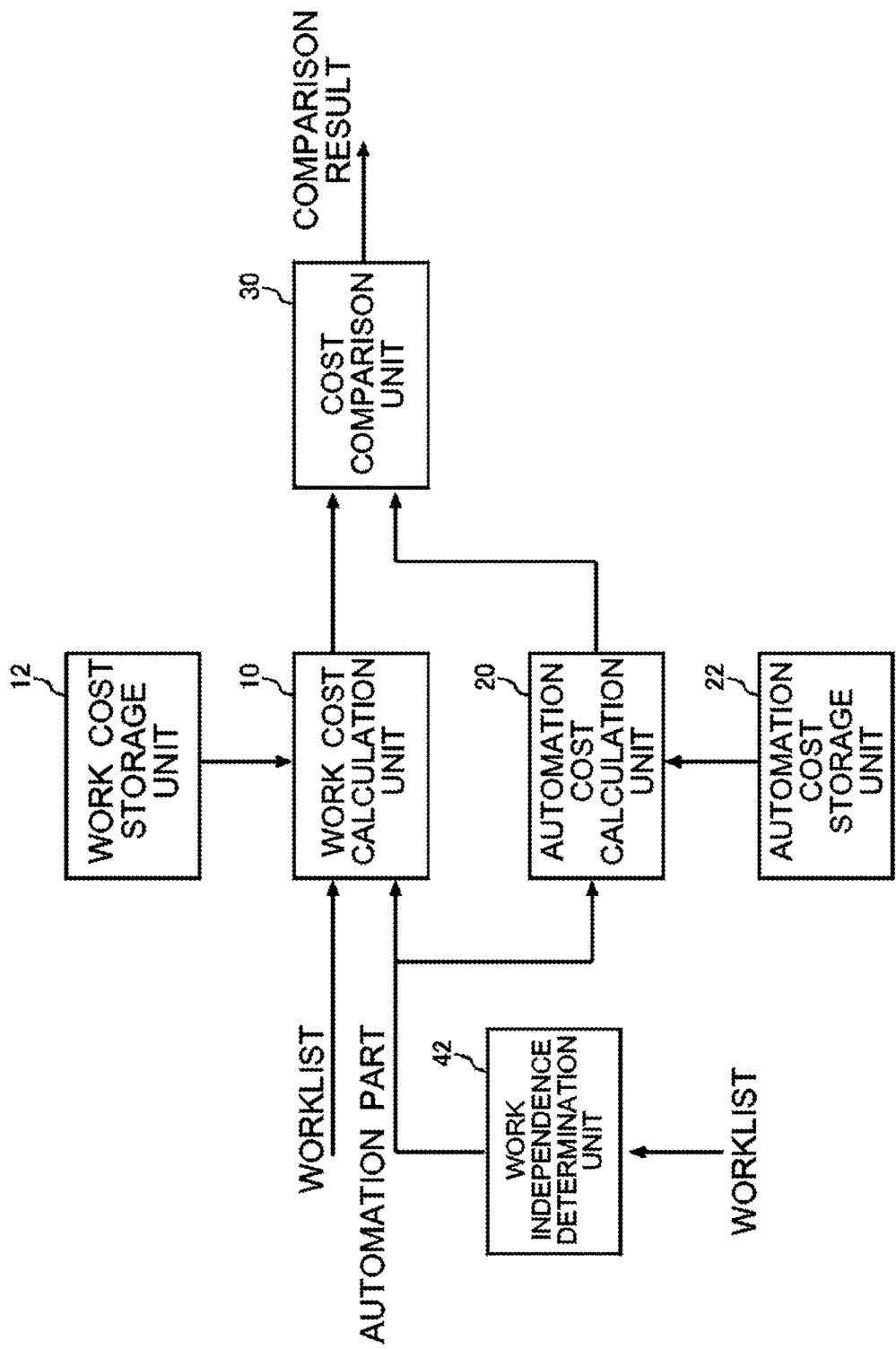
FIG. 7 illustrates another configuration example of the analysis apparatus 100.

FIG. 7 illustrates another configuration example of the analysis apparatus 100. The analysis apparatus 100 in this example includes a work independence determination unit 42 in addition to the configurations of any analysis apparatus 100 described in FIG. 1 to FIG. 6. The other configurations are similar to those of the analysis apparatus 100 in any aspect described in FIG. 1 to FIG. 6. In FIG. 7, an illustrative configuration is shown with an additional work independence determination unit 42 in the configuration of the analysis apparatus 100 shown in FIG. 1.

The worklist is input into the work independence determination unit 42. The worklist may be input by a user or the like of the analysis apparatus 100, or may be input by the worklist generation unit 40 described in FIG. 6. The work independence determination unit 42 determines whether each piece of work included in the worklist has the above-mentioned independence.

The work independence determination unit 42 determines whether the output of the work Wz of the determination target, which is work other than the work Wx, changes or not when some operations or parameters in the work Wx of the change target has changed. When the output of the work Wz of the determination target does not change, the work independence determination unit 42 may determine that the work Wz is independent of the work Wx. The work independence determination unit 42 may determine whether each piece of work Wz of the determination target is independent from all the work Wx of the change target. In another example, the work independence determination unit 42 may determine the independence of the work Wz regarding all the work Wx performed before the work Wz of the determination target, or may determine the independence of the work Wz regarding the work Wx performed immediately before the work Wz of the determination target.

When the output of the work Wx of the change target (work result) has a relationship used in the work Wz of the determination target, the work independence determination unit 42 may change only the processing method of the work Wx of the change target, and may determine whether the output of the work Wz changes when it is assumed that the work result of the work Wx does not change. When the output of the work Wz does not change, the work independence determination unit 42 may determine that the work Wz is independent of the work Wx.

The work independence determination unit 42 may select the work W with independence with respect to all other work as the automation target work, and notify the automation cost calculation unit 20 and the work cost calculation unit 10. In another example, the work independence determination unit 42 may output information indicating independence between the respective pieces of work, attached to the worklist. The automation cost calculation unit 20 may select the work W with independence with respect to all other work as the automation target work.

Figure 8:
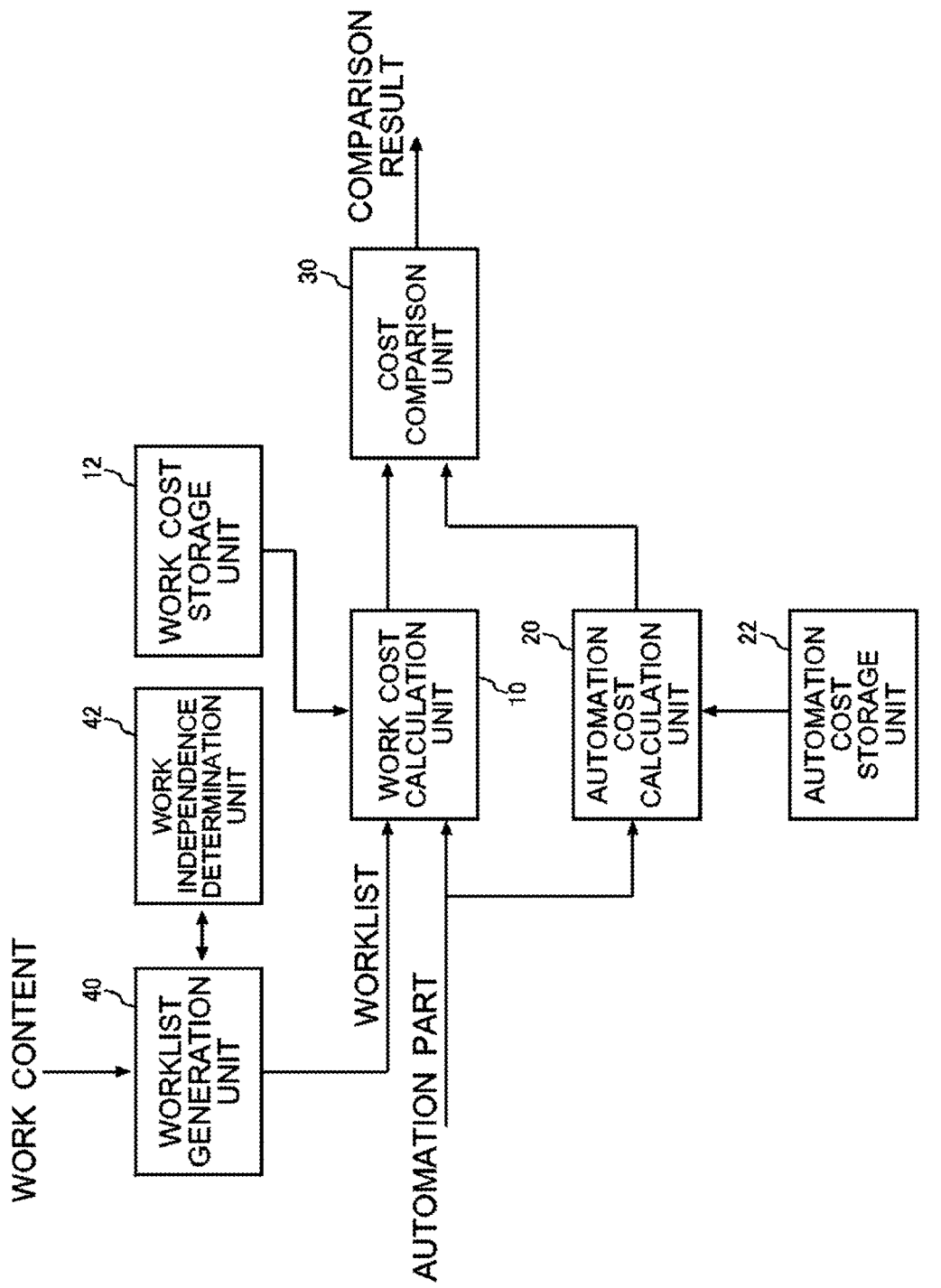
FIG. 8 illustrates another configuration example of the analysis apparatus 100.

FIG. 8 illustrates another configuration of the analysis apparatus 100. The analysis apparatus 100 in this example includes a work independence determination unit 42 in addition to the configurations of the analysis apparatus 100 described in FIG. 5. The other configurations are similar to those of the analysis apparatus 100 in any aspect described in FIG. 5. The work independence determination unit 42 in this example may have a similar function to the work independence determination unit 42 described in FIG. 7.

The work independence determination unit 42 in this example determines whether each piece of work included in the worklist produced by the worklist generation unit 40 has independence or not. The work independence determination unit 42 notifies the worklist generation unit 40 of the fact when no work has independence. The work independence determination unit 42 may notify the worklist generation unit 40 that which work Wa does not have independence with respect to which work Wb. Also, the work independence determination unit 42 may notify the worklist generation unit 40 that which work content Ya of the work Wa does not have independence with respect to which work content Yb of the work Wb.

The worklist generation unit 40 recreates the worklist based on the notification from the work independence determination unit 42 when no work included in the created worklist has independence. For example, the worklist generation unit 40 may combine the set of work Wa and Wb, which are determined to not have independence, as one piece of work. Also, the worklist generation unit 40 may re-allocate a series of work contents Y onto each piece of work so that the set of the work contents Ya and Yb, which hare determined not to have independence, are included in one piece of work W. The worklist generation unit 40 and the work independence determination unit 42 may repeat to create the worklist and determine the independence until each piece of work in the worklist retains independence.

Figure 9:
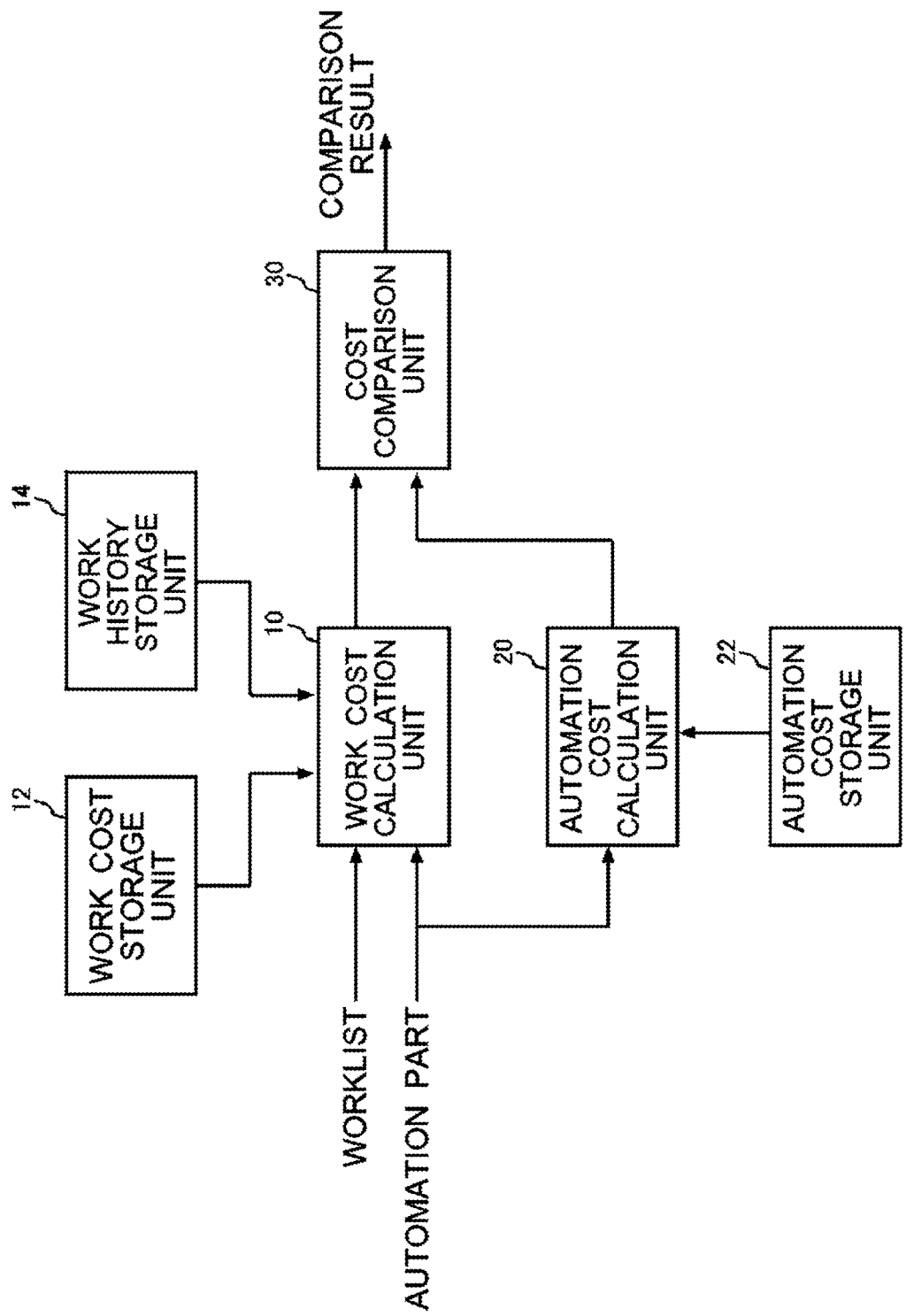
FIG. 9 illustrates another configuration example of the analysis apparatus 100.

FIG. 9 illustrates another configuration of the analysis apparatus 100. The analysis apparatus 100 in this example includes a work history storage unit 14 in addition to the configurations of any analysis apparatus 100 described in FIG. 1 to FIG. 8. The other configurations are similar to those of the analysis apparatus 100 in any aspect described in FIG. 1 to FIG. 8. In FIG. 9, an illustrative configuration is shown with an additional work history storage unit 14 in the configuration of the analysis apparatus 100 shown in FIG. 1.

The work history storage unit 14 may store the history of the work performed by the operator during the operation of the target plant. The work history storage unit 14 may also store the history of the work performed by the operator during the operation of the existing plant. The work history storage unit 14 may store the history of the automatic work that has already been automatized in the target plant or the existing plant. The work cost calculation unit 10 in this example may calculate at least one of the first workload or the second workload of the respective pieces of work based on the history of the work stored in the work history storage unit 14.

FIG. 10 illustrates one example of the work history stored in the work history storage unit 14. The work history storage unit 14 in this example stores the work history of the target plant. The work history storage unit 14 may store the identification information of the operator and the work time regarding each piece of work. The work history storage unit 14 may store information indicating the number of people performing the work. The work history storage unit 14 in the example of FIG. 10 stores identification information of each operator when a plurality of persons perform the work. Also, the work history storage unit 14 may store the average work time when an identical person repeats to perform the work.

When an identical work is performed by different operators, the work history storage unit 14 may store the work history for each operator. The work cost calculation unit 10 may use the average value of the work time for each operator as the work time for an identical work.

FIG. 11 illustrates another example of the work history stored in the work history storage unit 14. The work history storage unit 14 in this example stores the work history before automation and the work history after automation when the work in the existing plant has been automatized. The work history storage unit 14 in this example may store the work time after automation in addition to the work history shown in FIG. 10. That is, the work history storage unit 14 in this example stores first work time before the automation and second work time after the automation of each piece of work in the existing plant. In this way, the change in work time due to automation can be detected accurately based on the performance of the existing plant.

The work cost calculation unit 10 may extract work similar to the target work in the target plant from the work history storage unit 14. The work cost calculation unit 10 may calculate the similarity between the target work and the work stored in the work history storage unit 14. The work similarity may be calculated to be higher as the similarity of any attribute of the type, performance, structure and scale of the target apparatus is higher. The work similarity may be calculated to be higher as the similarity of any attribute of the work content and the time required for the work is higher. The work similarity may be calculated to be higher as the similarity of any attribute of the products produced by the work, the parameter values output by the work or the parameter values input into the work is higher. The similarity of the attribute may be calculated by a predetermined arithmetic expression. In the respective pieces of work, the above-mentioned attributes may be preset. The work history storage unit 14 may store the attributes.

Also, the work history storage unit 14 may store the work history for each automation type. That is, regarding an identical work, a plurality of work histories of different automation types may be stored. The work cost calculation unit 10 may extract work histories that are similar to the automation type that is about to be performed for the target work. The similarity of the automation type may be calculated to be higher as the similarity of any attribute of the apparatus used for automation and the automation range is higher.

Figure 12:
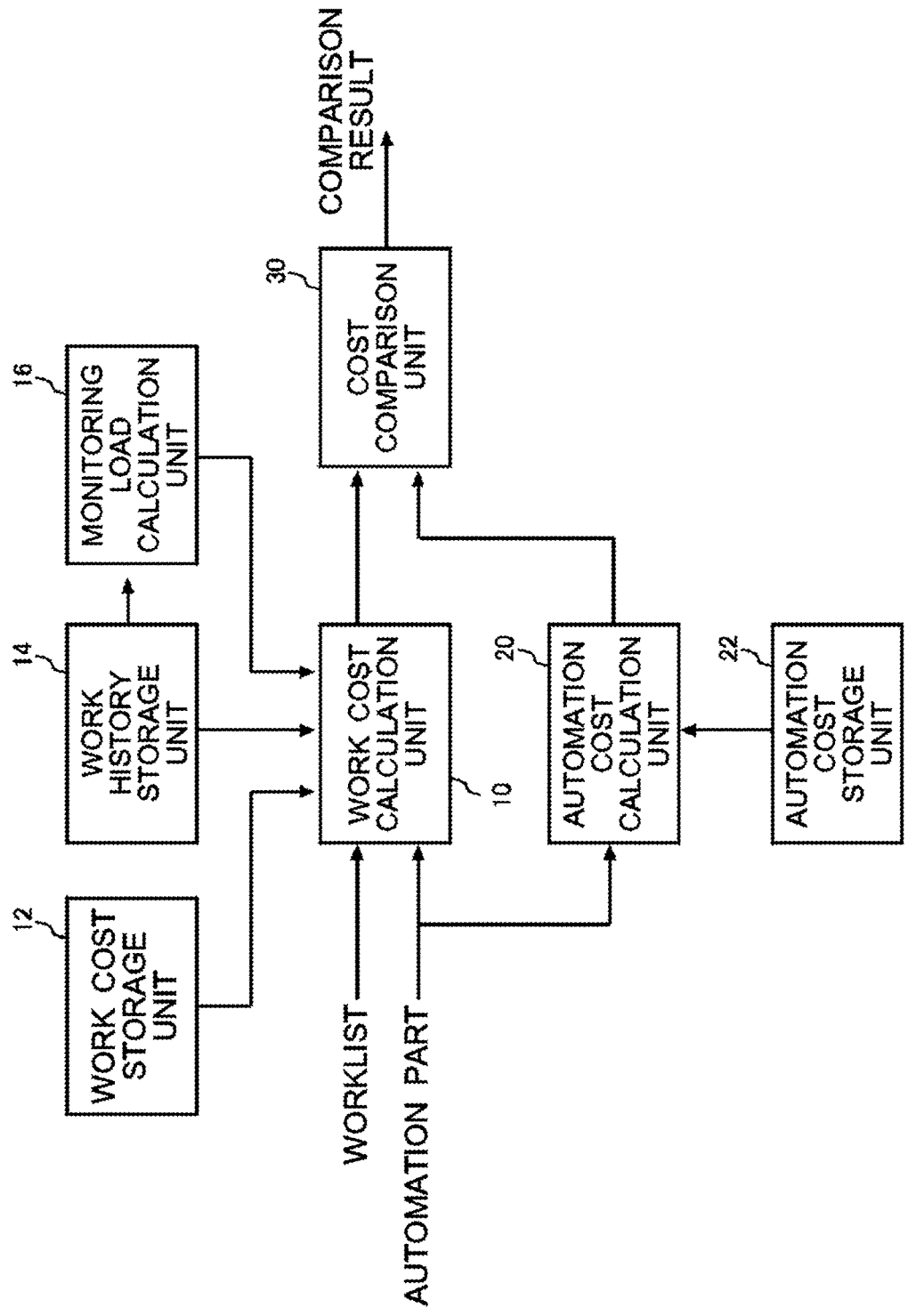
FIG. 12 illustrates another configuration example of the analysis apparatus 100.

FIG. 12 illustrates another configuration of the analysis apparatus 100. The analysis apparatus 100 in this example includes a work history storage unit 14 and a monitoring load calculation unit 16 in addition to the configurations of any analysis apparatus 100 described in FIG. 1 to FIG. 11. The other configurations are similar to those of the analysis apparatus 100 in any aspect described in FIG. 1 to FIG. 11. In FIG. 12, an illustrative configuration is shown with an additional work history storage unit 14 and a monitoring load calculation unit 16 in the configuration of the analysis apparatus 100 shown in FIG. 1.

The monitoring load calculation unit 16 calculates the estimated value of the change in the monitoring load on the operator for the target work performed automatically when the target work has been automatized. The monitoring load on the operator refers to a length of the actual working hours the operator is required to be in a state where he or she can monitor the state of device or the like. The actual working hours may include the time when the operator operates the device and the time when the operator does not operate on the device but waits without doing any other work. For example, the actual working hours includes the time to wait until the behavior of the device is stabilized when a predetermined operation is performed on the device. By automatizing the work, the actual working hours can be reduced.

When it is not required to monitor the state of the device or the like, the fact may be indicated on the control apparatus for controlling the device. The monitoring load on the operator may be a length of a period when the fact is not indicated among a predetermined unit period. The monitoring load calculation unit 16 may calculate the estimated value based on the performance value in the existing plant. The work history storage unit 14 may store the performance value of the change in the monitoring load on the operator in the existing plant.

The work cost calculation unit 10 may calculate the work cost when another piece of work is performed with respect to the operator with the monitoring load reduced. That is, the work cost calculation unit 10 may calculate the decrease in the entire work cost by allocating another piece of work onto available operators by automatizing the target work. The work cost calculation unit 10 may calculate the change in the work cost if the operator is allowed to perform another piece of work, provided that the monitoring load on the operator has been reduced by automatizing the target work.

Also, the work cost calculation unit 10 may allocate a plurality of pieces of work to be performed in parallel to the operator. In this case, since the number of operators can be reduced, the work cost of these pieces of work can further be reduced. The work history storage unit 14 may store the evaluation when the plurality of pieces of work are performed in parallel for each operator. The evaluation may include the presence or absence of experience in performing the plurality of pieces of work in parallel, the length of such experience, the accuracy of the work when performing the plurality of pieces of work in parallel, the efficiency of the work and so on. The work cost calculation unit 10 may allocate a plurality of pieces of work to the operator whose ratings are equal to or above a certain level. Also, the work cost calculation unit 10 may compensate the work cost of these pieces of work based on the work efficiency when a plurality of pieces of work are allocated to the operator. For example, for each operator, a drop rate in work efficiency when a plurality of pieces of work are performed in parallel is set, and the work cost calculation unit 10 may compensate the work cost based on the drop rate. The drop rate in work efficiency may be calculated based on the comparison result between the work cost when performing a plurality of pieces of work in parallel and the total work cost when performing each piece of work alone in the past performance of each operator.

FIG. 13 illustrates another example of information stored in the work history storage unit 14. The work history storage unit 14 in this example stores the performance value of the monitoring load on the operator (the length of the actual working hours) before and after the automation of each piece of work in addition to the information described in FIG. 11. The performance value may be a value measured in the existing plant.

In this example, the monitoring load calculation unit 16 may extract work similar to the target work in the target plant from the work history storage unit 14. The monitoring load calculation unit 16 may calculate the similarity between the target work and the work stored in the work history storage unit 14.

The monitoring load calculation unit 16 may extract the performance value of an operator who is similar to the operator that preforms the target work in the target plant from the work history storage unit 14. The similarity of the operators may be calculated based on attributes such as years of experience of the operators in the work, qualifications related to the work, evaluation of the operators and so on, for example. The work history storage unit 14 may store the attributes of each operator.

The work cost calculation unit 10 may determine the allocation of any other work to an available operator based on the decrease in the monitoring load on the operator. The work cost calculation unit 10 may compare the first workload stored in the work history storage unit 14 to the decrease in the monitoring load. The work cost calculation unit 10 may determine, based on the comparison results, whether to perform each piece of work with the decrease in the monitoring load.

Also, the work cost calculation unit 10 may also determine, based on the location for performing each piece of work, whether to allocate any other work to an available operator. For example, the work cost calculation unit 10 may prioritize and allocate the work to be performed at a location close to the location where the target work to be automated to the operator. The work cost calculation unit 10 may provide information about the location where each piece of work is performed.

Also, the work cost calculation unit 10 may also determine whether to allocate any other work based on the attributes of the operator. The attributes may include information related to work that has been experienced by the operator, or work that is executable to the operator. The attributes may include evaluations to the remote work of the operator. The evaluations may include a history about what work has been performed remotely, or may include an evaluation of the efficiency of the remote work, such as the required time spent on each remote work. The work cost calculation unit 10 may allocate a remote operator to each piece of work based on the attributes of the operator. For example, the work cost calculation unit 10 may allocate a remote operator to each piece of work, provided that the efficiency of the remote operation for the work is equal to or greater than a predetermined value.

Also, the work cost calculation unit 10 may extract the operator allocated to each piece of work based on the time difference between the location of the target plant and the location of each operator. For example, the work cost calculation unit 10 may extract the operator whose time to perform the work is included in the recommended work time zone predetermined in the local time of each operator's location. Also, the work cost calculation unit 10 may extract the remote operator as described above if the time when the work should be performed in the local time of the target plant location is included in the predetermined work deprecation time zone. For example, if the time when the work should be performed in the local time of the location of the target plant is midnight, the work cost calculation unit 10 extracts remote operators who can perform the work during normal working hours. In this way, the cost for performing the work can be reduced, also the quality of the work can be improved. Also, the work cost calculation unit 10 may extract the operator whose time difference is equal to or greater than a predetermined value, and select the operator to be allocated to each piece of work from the extracted operators. If the time difference is equal to or greater than a predetermined value, it is more likely that each operator is available, and the operators can be extracted efficiently.

Figure 14:
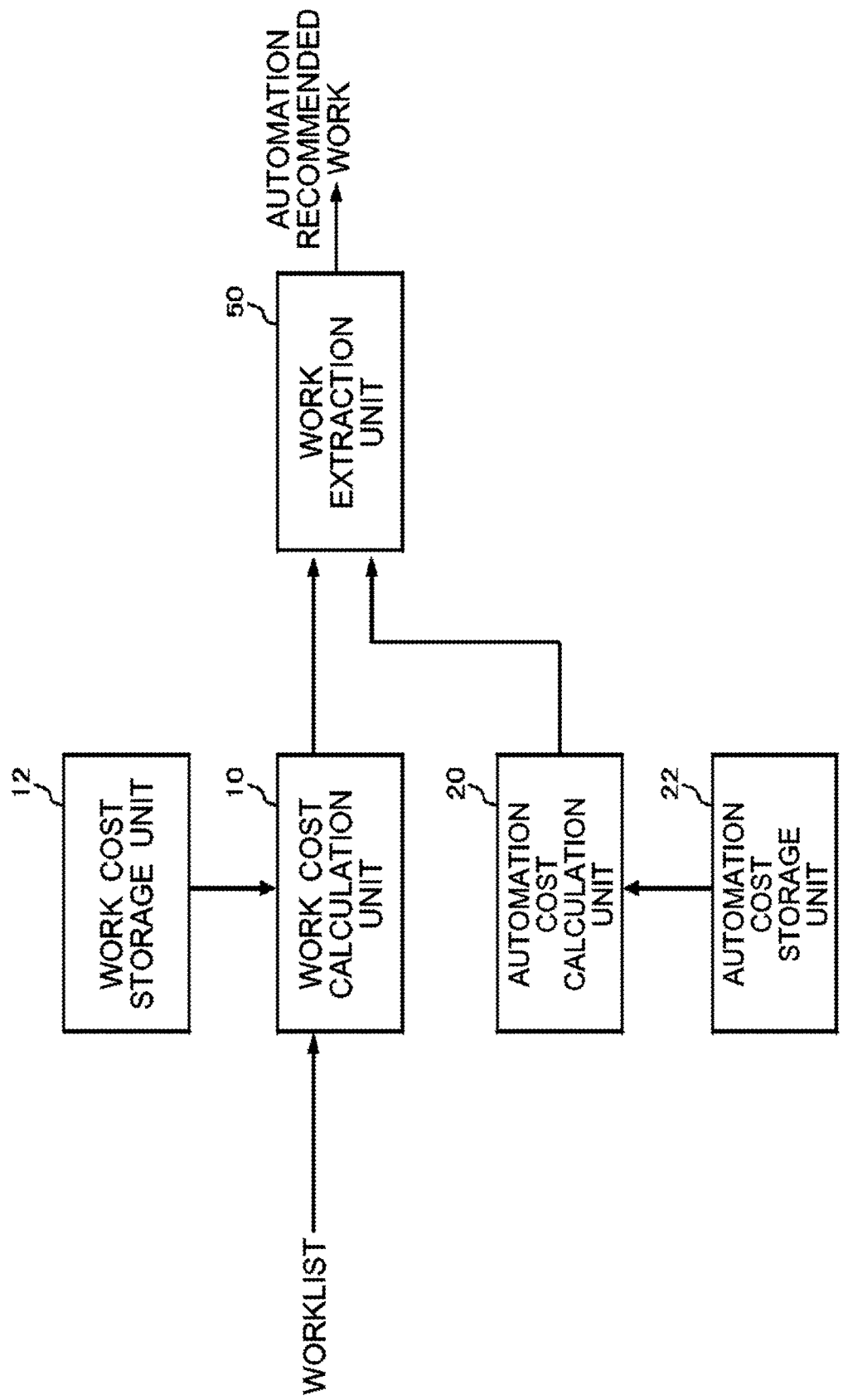
FIG. 14 illustrates another configuration example of the analysis apparatus 100.

FIG. 14 illustrates another configuration of the analysis apparatus 100. The analysis apparatus 100 in this example includes a work extraction unit 50 in place of the cost comparison unit 30 in the configuration of any analysis apparatus 100 described in FIG. 1 to FIG. 13. The other configurations are similar to those of the analysis apparatus 100 in any aspect described in FIG. 1 to FIG. 13. In FIG. 14, in the configuration of the analysis apparatus 100 shown in FIG. 1, a configuration including the work extraction unit 50 is illustrated. The work extraction unit 50 may have the functions of the cost comparison unit 30.

The work cost calculation unit 10 in this example calculates the change in the work cost before and after the automation of the work for each of the plurality of pieces of work among the work included in the worklist. The work extraction unit 50 extracts the work that is recommended for automation based on the change in the work cost before and after automation in each piece of work and the automation cost. The work extraction unit 50 may output a list of work recommended for automation in an order from the greatest difference between the decrease in the work cost and the automation cost. The work extraction unit 50 may output each piece of work, the decrease in the work cost when the work is automated and the automation cost by correspondence.

Figure 15:
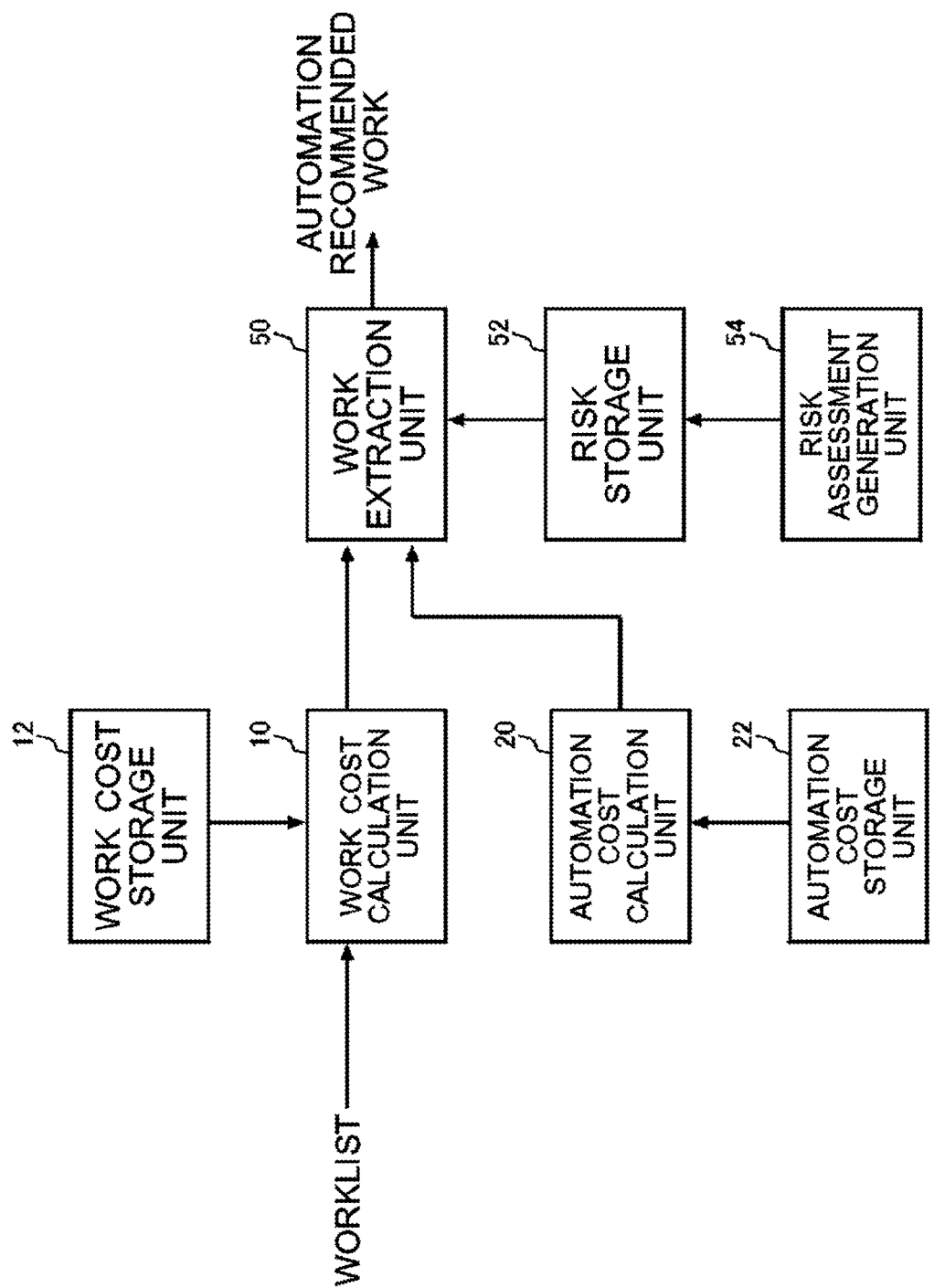
FIG. 15 illustrates another configuration example of the analysis apparatus 100.

FIG. 15 illustrates another configuration of the analysis apparatus 100. The analysis apparatus 100 in this example includes a risk storage unit 52 and a risk assessment generation unit 54 in addition to the configurations of the analysis apparatus 100 described in FIG. 14. The other configurations are similar to those of the analysis apparatus 100 described in FIG. 14.

The risk storage unit 52 stores the risk assessment information that evaluates the risks that would occur if the plurality of pieces of target work in the target plant are automatized. The risk storage unit 52 may store information on risk cases, such as a failure, quality degradation and so on, that has occurred in the automation of work in the existing plant. Herein, the "risk" refers to a so-called negative risk, such as the occurrence of adverse events. The risk storage unit 52 may store a risk assessment value that quantizes a risk when the work is automated. The risk storage unit 52 may store the risk assessment information for each automation type. The work extraction unit 50 may also calculate the risk assessment value based on the risk assessment information stored in the risk storage unit 52.

The risk assessment value may be calculated based on the probability of a risk case occurring when automation is performed, the cost of repairing the device when a risk case occurs, the degree of performance degradation of the device, the duration of device shutdown, the range of devices affected by the risk case, the quality degradation of the plant's products, the reduction in the amount of products produced and so on. The higher the probability of a risk case occurring, the higher the risk assessment value, and the greater the loss in the event of a risk case occurring.

Also, the risk assessment value may be calculated based on the operation frequency of the operator or the amount of operations in the work. Work that requires less frequent or smaller amount of operations by the operator may have a smaller risk assessment value when automatized.

The work extraction unit 50 extracts the work recommended for automation based on the risk assessment information stored in the risk storage unit 52. For example, the work extraction unit 50 may extract the work with the risk assessment value when automatized included in a certain range.

The risk storage unit 52 may store the risk assessment information produced from the simulation results of the behaviors of the target apparatus to be a target of the work. The risk assessment generation unit 54 may perform the simulation and produce the risk assessment information. The risk assessment generation unit 54 may produce the risk assessment information when the work is automatized based on the actual behavior result of the target apparatus when the work is performed and the behavior result according to the simulation. That is, the risk assessment generation unit 54 may regard the comparison result between the actual behaviors of the target apparatus and the estimated behaviors as the risk assessment information. If the discrepancy between the actual behavior and the estimated behavior is small, the risk assessment value in the case of automation may be estimated low because the possibility of irregular behavior occurring even in the case of automation is low. The actual behavior result may use the behavior result in the analysis target plant, or may use the behavior result in similar work in the existing plant.

Also, the risk assessment generation unit 54 may produce the risk assessment information of the work for the target apparatus based on the difference between the intermediate manufactured product input into the target apparatus and the processed manufactured product output by the target apparatus for the target apparatus that becomes the target of the work. The intermediate manufactured product and the processed manufactured product may be in any state of liquid, gas or solid. The difference between the intermediate manufactured product and the processed manufactured product may include any of the difference in the above-mentioned state, the difference in the concentration of a specified substance, the difference in the properties such as viscosity. These differences may be quantized according to a predetermined algorithm. If the difference between the intermediate manufactured product and the processed manufactured product of the work is small, the impact of the work on the final product is considered to be relatively small, and the risk assessment value of automatizing the work may be estimated to be small.

FIG. 16 illustrates one example of the risk assessment information stored in the risk storage unit 52. For each piece of work, the risk storage unit 52 stores at least one of the type of automation performed in the existing plant, the risk cases that occurred, the costs incurred by the risk cases, the period of time it took to recover from the risk cases, or the range of devices affected by the risk cases. For each piece of work, the risk storage unit 52 may also store examples of automation in which no risk cases occurred. The risk storage unit 52 may store risk assessment values corresponding to each automation type, as described above. Also the risk storage unit 52 may also store risk assessment information calculated from simulation results or produced from differences in the intermediate manufactured product and the processed manufactured product of the target apparatus.

Figure 17:
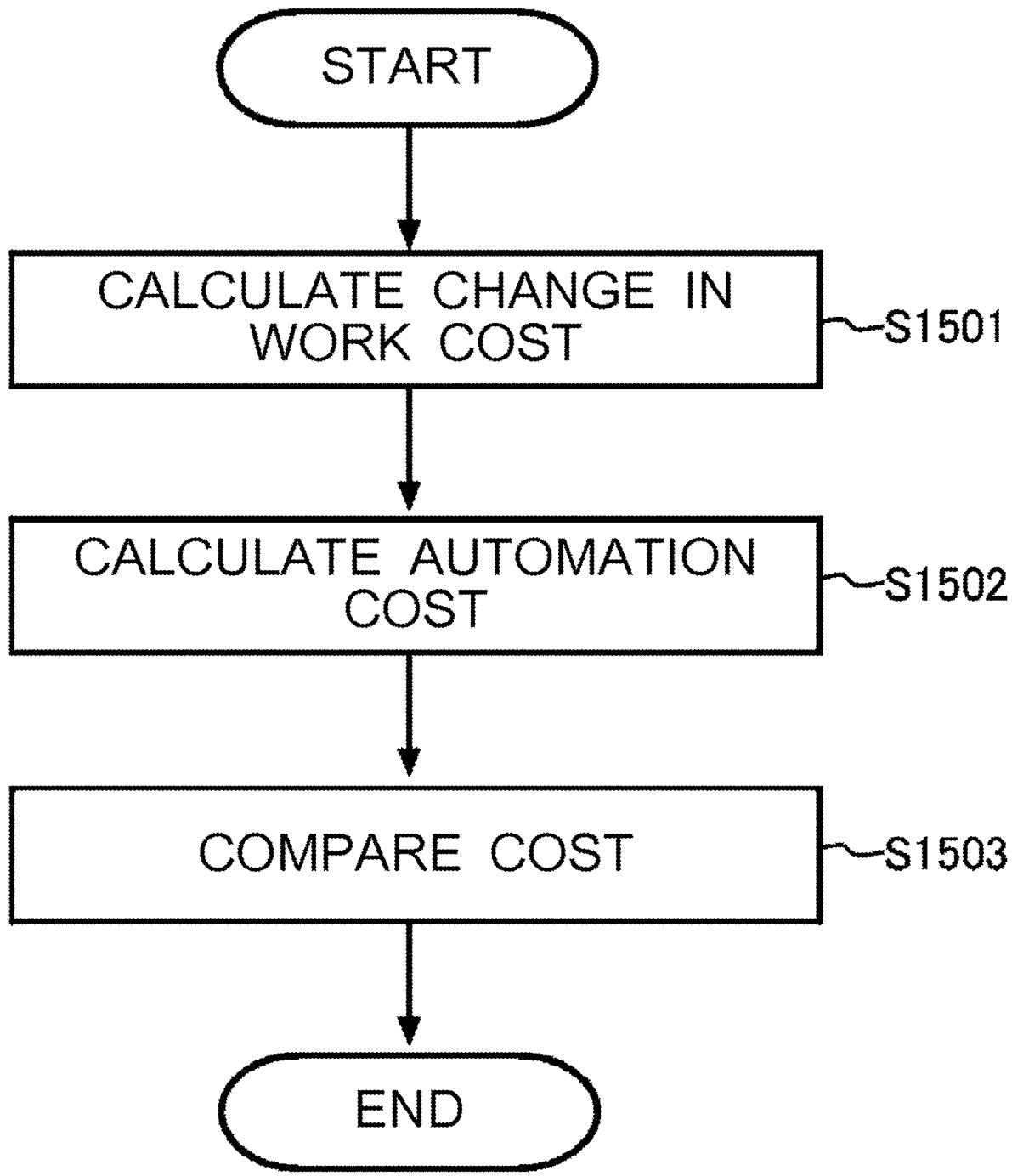
FIG. 17 illustrates one example of an analysis method of the analysis target plant.

FIG. 17 illustrates one example of an analysis method of the analysis target plant. Each processing in the analysis method is similar to the behaviors of the analysis apparatus 100 described with reference to FIG. 1 to FIG. 16.

First, the work cost calculation unit 10 calculates the change in the work cost before and after the automation of predetermined work (S1501). Also, the automation cost calculation unit 20 calculates the automation cost for automatizing the work (S1502). Then, the cost comparison unit 30 compares the change in the work cost to the automation cost (S1503). In the analysis method, in addition to the processing shown in FIG. 17, the processing described in FIG. 1 to FIG. 16 may be performed.

Figure 18:
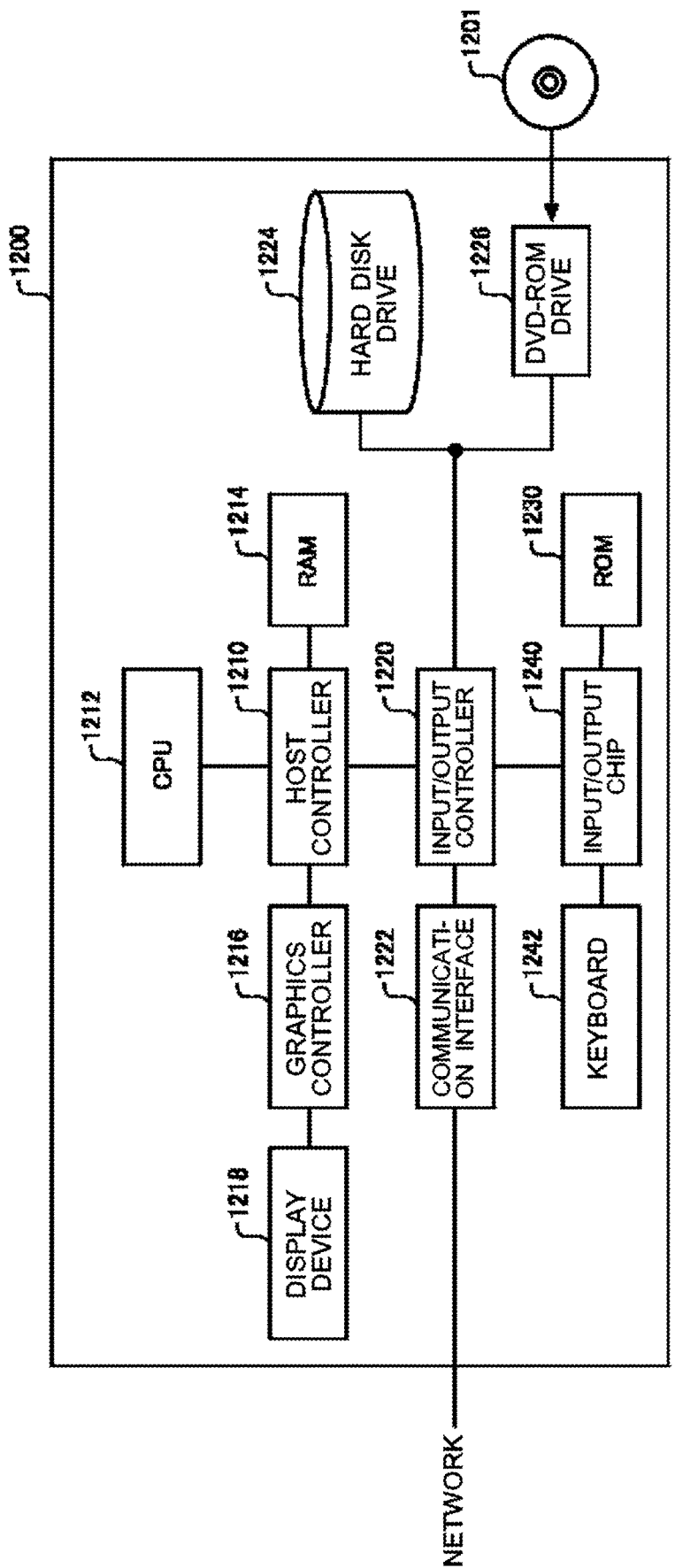
FIG. 18 illustrates a configuration example of a computer 1200 in which a plurality of aspects of the present invention may be entirely or partially embodied.

FIG. 18 illustrates an example configuration of a computer 1200 in which all or some aspects of the present invention can be embodied. A program that is installed in the computer 1200 can cause the computer 1200 to function as or execute operations associated with the apparatus of the embodiment of the present invention or one or more sections of the apparatus, and/or cause the computer 1200 to execute the process of the embodiment of the present invention or steps thereof. Such program may be executed by a CPU 1212 so as to cause the computer 1200 to execute certain operations associated with some or all of the blocks of flowcharts and block diagrams described herein. Processes according to embodiments of the present invention or steps of the processes may also be performed on a cloud network or the like.

The computer 1200 according to the present embodiment includes the CPU 1212, a RAM 1214, a graphic controller 1216 and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input and output units such as a ROM 1230 and a keyboard 1242, which are connected to the input and output controller 1220 via an input and output chip 1240.

The CPU 1212 is configured to operate according to programs stored in the ROM 1230 and the RAM 1214, thereby controlling each unit. The graphics controller 1216 acquires image data generated by the CPU 1212 on a frame buffer or the like provided in the RAM 1214 or in the graphics controller 1216 itself, and displays the image data on the display device 1218.

The communication interface 1222 communicates with other electronic devices via a network. The hard disk drive 1224 is configured to store programs and data that are used by the CPU 1212 within the computer 1200. The DVD-ROM drive 1226 is configured to read programs or data from the DVD-ROM 1201, and to provide the hard disk drive 1224 with the programs or data via the RAM 1214. The IC card drive reads programs and data from an IC card, and/or writes programs and data into the IC card.

The ROM 1230 is configured to store a boot program or the like that is executed by the computer 1200 at the time of activation, and/or a program depending on the hardware of the computer 1200. The input/output chip 1240 may also connect various input/output units to the input/output controller 1220 via a parallel port, a serial port, a keyboard port, a mouse port or the like.

A program is provided by a computer-readable storage medium such as the DVD-ROM 1201 or the IC card. The program is read from the computer-readable storage medium, is installed into the hard disk drive 1224, the RAM 1214 or the ROM 1230, which are also examples of the computer-readable storage medium, and is executed by the CPU 1212. Information processing described in these programs is read into the computer 1200, resulting in cooperation between the programs and the various types of hardware resources described above. An apparatus or a method may be configured by realizing an operation or processing of information according to a use of the computer 1200.

For example, if communication is made between the computer 1200 and external devices, the CPU 1212 may execute a communication program loaded on the RAM 1214, and instruct the communication interface 1222 to perform communication processing based on the processing described in the communication program. Under the control of the CPU 1212, the communication interface 1222 reads transmission data stored in a transmission buffer region provided in a recording medium such as the RAM 1214, the hard disk drive 1224, the DVD-ROM 1201 or an IC card, and sends the read transmission data to the network, or writes reception data received from the network into a reception buffer region or the like provided in the recording medium.

In addition, the CPU 1212 may be configured to cause all or a necessary portion of a file or a database, which has been stored in an external recording medium such as the hard disk drive 1224, the DVD-ROM drive 1226 (DVD-ROM 1201) and the IC card, to be read into the RAM 1214, thereby executing various types of processing on the data on the RAM 1214. Next, the CPU 1212 may be configured to write the processed data back to the external recording medium.

Various types of information, such as various types of programs, data, tables, and databases, may be stored in the recording medium for information processing. The CPU 1212 may be configured to execute, on the data read from the RAM 1214, various types of processing including various types of operations, processing of information, conditional judgment, conditional branching, unconditional branching, search and replacement of information and the like described in the present disclosure and specified by instruction sequences of the programs, and to write a result back to the RAM 1214. The CPU 1212 may also be configured to search for information in a file, a database, etc., in the recording medium. For example, when a plurality of entries, each having an attribute value of a first attribute associated with an attribute value of a second attribute, is stored in the recording medium, the CPU 1212 may be configured to search for an entry having a designated attribute value of the first attribute that matches a condition from the plurality of entries, and to read the attribute value of the second attribute stored in the entry, thereby acquiring the attribute value of the second attribute associated with the first attribute that satisfies a predetermined condition.

The programs or software modules described above may be stored in the computer-readable storage medium on the computer 1200 or near the computer 1200. In addition, a recording medium such as a hard disk or a RAM provided in a server system connected to a dedicated communication network or the Internet can be used as a computer-readable storage medium, thereby providing the programs to the computer 1200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: work cost calculation unit; 12: work cost storage unit; 14: work history storage unit; 16: monitoring load calculation unit; 20: automation cost calculation unit; 22: automation cost storage unit; 30: cost comparison unit; 40: worklist generation unit; 42: work independence determination unit; 50: work extraction unit; 52: risk storage unit; 54: risk assessment generation unit; 100: analysis apparatus; 1200: computer; 1201: DVD-ROM; 1210: host controller; 1212: CPU; 1214: RAM; 1216: graphics controller; 1218: display device; 1220: input/output controller; 1222: communication interface; 1224: hard disk drive; 1226: DVD-ROM drive; 1230: ROM; 1240: input/output chip; 1242: keyboard

What is claimed is:

1. An analysis apparatus, comprising
at least one processor;
a worklist generation unit, in the at least one processor, configured to detect those work operations by an operator that affect each other, and which converts contents of the work operations by the operator that affect each other into a worklist such that the work operations by the operator that affect each other are included in a single piece of work;
a work independence determination unit, in the at least one processor, configured to determine an independence of each of the work operations by the operator that affect each other in the worklist;
a work cost calculation unit, in the at least one processor, configured to calculate a change in a work cost of a target plant including a device and a pipeline when at least some target work, among the work operations of the operator required to operate the target plant including the device and the pipeline, is automated;
an automation cost calculation unit, in the at least one processor, configured to calculate an automation cost for automating the at least some target work; and
a cost comparison unit, in the at least one processor, configured to compare the work cost with the automation cost when the target plant is operated for a predetermined period after the automating,
whereby the at least some target work is automated when a decrease in the work cost is greater than the automation cost.

2. The analysis apparatus according to claim 1, wherein the work cost calculation unit is further configured to calculate the change in the work cost, based on a first workload of the operator when the at least some target work is not automated and a second workload of the operator when the at least some target work is automated.

3. The analysis apparatus according to claim 2, further comprising
a monitoring load calculation unit, in the at least one processor, configured to calculate, when the at least some target work is automated, a change in a monitoring load on the operator for the at least some target work performed automatically.

4. The analysis apparatus according to claim 3, wherein the work cost calculation unit is further configured to calculate the change in the work cost when the operator is allowed to perform another piece of work, provided that the monitoring load on the operator is reduced by automating the at least some target work.

5. The analysis apparatus according to claim 2, further comprising
a work history storage unit, in the at least one processor, configured to store a history of work performed by the operator in the target plant including the device and the pipeline under operation,
wherein the work cost calculation unit is further configured to calculate the first workload based on the history of the work stored in the work history storage unit.

6. The analysis apparatus according to claim 5, wherein the work history storage unit is further configured to store a first history of the at least some target work performed before the automation and a second history of the at least some target work after the automation when the at least some target work is automated in the target plant including the device and the pipeline; and
the work cost calculation unit is further configured to calculate the first workload and the second workload based on the first history and the second history of the at least some target work stored in the work history storage unit.

7. The analysis apparatus according to claim 1, wherein the work cost calculation unit is further configured to calculate the change in the work cost when automated for the at least some target work; and the analysis apparatus further comprises
a work extraction unit, in the at least one processor, which is configured to extract those of the work operations of the operator that should be automated, based on a change in a plurality of the work costs that are calculated by the work cost calculation unit.

8. The analysis apparatus according to claim 7, further comprising
a risk storage unit, in the at least one processor, configured to store risk assessment information for evaluating a risk occurred when the at least some target work is automated at the target plant including the device and the pipeline,
wherein the work extraction unit is further configured to extract those of the work operations of the operator that should be automated further based on the risk assessment information, and
the risk assessment information includes a degradation of the device.

9. The analysis apparatus according to claim 8, wherein the risk storage unit is further configured to store, as the risk assessment information, information related to a case where the at least some target work in the target plant including the device and the pipeline is automated.

10. The analysis apparatus according to claim 8, further comprising
a risk assessment generation unit, in the at least one processor, configured to perform a simulation on a behavior of a target apparatus to be a target of work, and produce the risk assessment information of the work, based on an actual behavior result of the target apparatus when the work is performed and a behavior result according to the simulation.

11. The analysis apparatus according to claim 8, further comprising
a risk assessment generation unit, in the at least one processor, configured to produce, for a target apparatus to be a target of the work, the risk assessment information of the work for the target apparatus, based on a difference between an intermediate manufactured product input into the target apparatus and a processed manufactured product output by the target apparatus.

12. An analysis method, comprising
detecting those work operations by an operator that affect each other, and which converts contents of the work operations by the operator that affect each other into a worklist such that the work operations by the operator that affect each other are included in a single piece of work;
determining an independence of each of the work operations by the operator that affect each other in the worklist;
changing a work cost of a target plant including a device and a pipeline when at least some target work, among the work operations of an operator required to operate the target plant including the device and the pipeline, is automated;
calculating an automation cost for automating the at least some target work;
comparing the work cost with the automation cost when the target plant is operated for a predetermined period after the automating; and
automating the at least some target work when a decrease in the work cost is greater than the automation cost.

13. A non-transitory computer readable medium having a program recorded thereon, which when executed by the computer, causing the computer to
detect those work operations by an operator that affect each other, and which converts contents of the work operations by the operator that affect each other into a worklist such that the work operations by the operator that affect each other are included in a single piece of work;
determining an independence of each of the work operations by the operator that affect each other in the worklist;
changing a work cost of a target plant including a device and a pipeline when at least some target work, among the work operations of an operator required to operate the target plant including the device and the pipeline, is automated;
calculating an automation cost for automating the at least some target work;
comparing the work cost with the automation cost when the target plant is operated for a predetermined period after the automating; and
automating the at least some target work when a decrease in the work cost is greater than the automation cost.

* * * * *